United States Patent
Grott et al.

(10) Patent No.: US 10,384,181 B2
(45) Date of Patent: Aug. 20, 2019

(54) TAPERED CONDUITS FOR REACTORS

(71) Applicant: UOP LLC, Des Plaines, IL (US)

(72) Inventors: Jeffrey R. Grott, Chicago, IL (US); Michael J. Vetter, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/798,337

(22) Filed: Oct. 30, 2017

(65) Prior Publication Data

US 2018/0050314 A1 Feb. 22, 2018

Related U.S. Application Data

(63) Continuation of application No. PCT/US2016/038460, filed on Jun. 21, 2016.

(60) Provisional application No. 62/184,462, filed on Jun. 25, 2015.

(51) Int. Cl.
*B01J 8/02* (2006.01)
*B01D 53/04* (2006.01)
*B01D 53/88* (2006.01)

(52) U.S. Cl.
CPC ........ *B01J 8/0214* (2013.01); *B01D 53/0431* (2013.01); *B01J 8/0278* (2013.01); *B01D 53/885* (2013.01); *B01D 2253/102* (2013.01); *B01J 2208/0092* (2013.01); *B01J 2208/00849* (2013.01); *B01J 2208/00884* (2013.01); *B01J 2208/00929* (2013.01)

(58) Field of Classification Search
CPC .............................. B01J 8/0214; B01J 8/0278

USPC ........................................................ 422/218
See application file for complete search history.

(56) References Cited

U.S. PATENT DOCUMENTS

| 3,167,399 | A | | 1/1965 | Hansen, Jr. | |
|---|---|---|---|---|---|
| 3,909,208 | A | * | 9/1975 | Boret | B01J 8/0214 422/218 |
| 4,277,444 | A | * | 7/1981 | Van Landeghem | B01J 8/003 422/634 |
| 4,374,094 | A | * | 2/1983 | Farnham | B01J 8/008 208/146 |

(Continued)

FOREIGN PATENT DOCUMENTS

| CN | 1030877 A | 2/1989 |
|---|---|---|
| CN | 1913959 A | 2/2007 |

(Continued)

OTHER PUBLICATIONS

Search Report dated Oct. 13, 2016 for corresponding PCT Appl. No. PCT/US2016/038460.

(Continued)

*Primary Examiner* — Huy Tram Nguyen

(57) ABSTRACT

An apparatus is provided for directing a fluid in a radial reactor comprising: a vertically elongated conduit comprising a front face comprising a surface comprising apertures, two side faces, and a rear face and two ends, wherein an end of the front face and an end of the rear face are a distance D1 apart and wherein a second opposite end of the front face and a second corresponding end of the rear face are a distance D2 apart wherein D1 is greater than D2 and wherein a riser are connected to a top surface of said vertically elongated conduit to allow a gas stream to flow through the riser to the vertically elongated conduit.

14 Claims, 8 Drawing Sheets

(56) References Cited

U.S. PATENT DOCUMENTS

| | | | |
|---|---|---|---|
| 4,374,095 A * | 2/1983 | Legg | B01J 8/0214 208/146 |
| 4,540,547 A | 9/1985 | Schuurman | |
| 5,118,419 A * | 6/1992 | Evans | B01J 8/0214 210/291 |
| 5,209,908 A | 5/1993 | Koves et al. | |
| 5,366,704 A * | 11/1994 | Koves | B01J 8/003 208/113 |
| 5,759,242 A | 6/1998 | Smolarek et al. | |
| 5,779,988 A | 7/1998 | Zardi et al. | |
| 5,885,442 A * | 3/1999 | Lapunow | B01J 8/0214 208/134 |
| 6,090,351 A * | 7/2000 | Euzen | B01J 8/003 422/213 |
| 6,224,838 B1 * | 5/2001 | Schulz | B01J 8/0085 422/216 |
| 6,984,365 B2 | 1/2006 | Nelson et al. | |
| 7,125,529 B2 * | 10/2006 | Ablin | B01J 8/003 422/211 |
| 7,226,568 B1 * | 6/2007 | Ham | B01D 53/0431 422/218 |
| 7,749,467 B2 * | 7/2010 | Naunheimer | B01D 53/0431 422/211 |
| 7,780,928 B2 | 8/2010 | Yuan | |
| 7,846,403 B2 | 12/2010 | Vetter et al. | |
| 9,095,830 B2 | 8/2015 | Vetter et al. | |
| 2002/0102192 A1 * | 8/2002 | Ward | B01J 8/0085 422/181 |
| 2008/0274024 A1 * | 11/2008 | Vetter | B01J 8/008 422/218 |
| 2013/0221123 A1 | 8/2013 | Oshinowo et al. | |
| 2016/0136603 A1 * | 5/2016 | Parihar | C10G 45/02 208/108 |

FOREIGN PATENT DOCUMENTS

| | | |
|---|---|---|
| CN | 1915930 A | 2/2007 |
| CN | 102658042 A | 9/2012 |
| CN | 103721643 A | 4/2014 |
| CN | 103962058 A | 8/2014 |
| EP | 0070591 A2 | 1/1983 |
| EP | 0483975 A1 | 5/1992 |
| RU | 2283694 C2 | 9/2006 |
| WO | 2008076692 A1 | 6/2008 |

OTHER PUBLICATIONS

Li, "Radial-Flow Packed-Bed Reactors. Ullmann's Encyclopedia of Industrial Chemistry", Copyright © 2002 by Wiley-VCH Verlag GmbH & Co. KGaA.

Mohammadikhah, "Improvement of Hydrodynamics Performance of Naphtha Catalytic Reforming Reactors Using CFD", Iran. J. Chem. Chem. Eng. Research Note vol. 33(3), 2014.

Kawagoe, "Radial liquid velocity distribution in an external-loop airlift column with a tapered riser", The Canadian Journal of Chemical Engineering; vol. 77, Issue 5, pp. 811-815, Oct. 1999.

\* cited by examiner

TAPERED CONDUITS FOR REACTORS

CROSS-REFERENCE TO RELATED APPLICATIONS

This application is a Continuation of copending International Application No. PCT/US2016/038460 filed Jun. 21, 2016 which application claims benefit of U.S. Provisional Application No. 62/184,462 filed Jun. 25, 2015, the contents of which cited applications are hereby incorporated by reference in their entirety.

BACKGROUND OF THE INVENTION

This invention relates to the field of fluid particle contact and to an apparatus for contacting fluids and particles. The invention further relates to fluid conduits which form the outer retaining wall for an annular particulate bed used in a radial flow system mounted in a cylindrical vessel. In such systems a fluid typically is directed radially inwardly or outwardly into or out of the particulate bed through openings in the inner surfaces of a plurality of outer, vertically arranged conduit members or through openings in a cylindrical screen basket member which has a smaller diameter than the inner wall of the vessel. The fluid passes through openings in a vertically arranged center pipe which forms the inner retaining wall for the annular particulate bed. The invention more particularly relates to fluid conduits having at least one tapered side relative to at least one reactor wall.

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, profile wire, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material.

The screens or meshes used to hold the catalyst particles within a bed are sized to have apertures sufficiently small that the particles cannot pass through. The vessel typically is a reactor which contains a bed of particulate material such as catalyst, absorbent, resins or activated carbon. The fluid which passes through the particulate bed in a radial direction is usually a gas, but it could also be a liquid or a liquid/gas mixture. In prior art systems, the outer wall support for the annular particulate bed is often a ring of individual scallops members which have convex inner surfaces and outer surfaces which conform to the wall of the vessel. The scallops members can be formed from metal plates which contain perforations smaller in diameter than the size of the particulate material. They can also be formed with their convex inner surface comprising a screen element having a plurality of closely spaced wires welded to support rods. Such scallops are often sized so they can be installed or replaced when required by lifting them through an opening in the top of the vessel. Another type of prior art system includes a cylindrical screen basket member which is spaced inwardly from the outer wall of the vessel. Such a cylindrically shaped screen basket member cooperates with an inner screen pipe member to cause the particulate bed positioned between such inner and outer members to have a uniform thickness. However, the systems is quite expensive since the large diameter screen cannot be installed or removed through a small upper opening in the vessel, as can the scallops type screen. In other embodiments, instead of individual scallops, the same function may be served by a screen that is mounted to cover the same area as the ring of individual scallops.

Examples of prior art systems which have scallops members around the inside surface of the outer vessel wall include Hansen, Jr. U.S. Pat. No. 3,167,399 and Koves et al U.S. Pat. No. 5,209,908. Farnham U.S. Pat. No. 4,374,094 shows vertical screen segments surrounding an annular catalyst bed which are spaced from the side wall of the vessel. Schuurman U.S. Pat. No. 4,540,547 shows a moving bed reactor wherein a ring of screen segments surrounds a centrally located catalyst bed and separates the catalyst from the outer annular chamber which receives the effluent after it passes through the screen surfaces. Nagaoka EP 0483975 A1 shows a device for holding particulate catalyst in a radial flow reactor which comprises a ring of vertically arranged containers having abutting side walls and screened inner walls, the containers being filled with catalyst and positioned between an annular outer fluid chamber and an inner cylindrical fluid chamber.

It has now been found that varying the catalyst bed depth and volume provides advantages in the operation of a reactor. This is useful in the chemical industry for maximum utilization of reactor vessel volumes, and the overall catalyst content in the reactor can be increased by more than 20% through the use of the present invention. A further advantage is that catalyst may be more efficiently utilized. Since the catalyst is deactivating via coke buildup as it falls through the reacting space. Having additional residence time in the lower regions of the reactor is favorable for process chemistries that involve deactivating catalysts. The present invention uses hydraulic balancing to achieve a significant increase in bed depth within constraints on cross-flow inner screen pinning design and overall reactor pressure drop. The path length found on the bottom of the vessel can even be increased by more than 33% in one case.

Reforming scallops sizing (depth) is typically governed by the riser entrance component to achieve acceptable pressure drop for feed distribution and minimize overall system pressure drop. This results in a significant volume for the overall piece of equipment.

SUMMARY OF THE INVENTION

The present invention provides a tapered outer support structure for the particulate bed in a radial flow system. In this structure each individual segment has a large cross-sectional area for flow to allow low flow velocities for the fluid and less turbulence. The reduced depth of the tapered device may allow the vessel diameter to be reduced for a given thickness of particulate bed as compared to a vessel incorporating scallops. There may be a plurality of vertically extending flow conduits having an open end for receiving or distributing flow are positioned adjacent each other in a ring around the inner circumference of the outer wall of the vessel. In some configurations, there may be a single conduit that extends for the circumference of the outer wall of the vessel. The inner walls of the conduits comprise a screen surface which defines the outer support structure for the particulate bed and includes flow openings which are of a lesser width than the diameter of the particulate material. The screen surface is preferably formed of parallel, closely spaced wires which are welded to underlying support rods. The screens which form the inner walls are preferably flat or slightly concave so that the particulate bed which extends between them and a circular center pipe screen member will have a substantially constant radial thickness. At least some of the flow conduits may have a generally trapezoidal shape. The flow conduits have an outer wall which lays against the inside vessel wall and has a radius that is the same as that of the inside vessel wall. Generally radially extending side wall portions of the conduits may have such angles and clearance between adjacent conduits that any individual conduit can be moved inwardly with no more than a small sliding displacement of adjacent conduits or by removal of a maximum of one adjacent conduit.

In a first embodiment, the diameter of the conduits at the top of the catalyst bed is greater than the diameter at the bottom of the catalyst bed due to a taper in the structure. The taper may be the result of either a front face or a rear face of a conduit being tapered relative to a reactor wall. The taper may be for the entire length of the face or for a portion of the length. In some embodiments the tapered face is straight, while in other embodiments, the tapered face may be curved. In another embodiment, the conduits may be scallops that are D-shaped and are tapered so that their depth is greater at the top or the bottom of the catalyst bed.

DETAILED DESCRIPTION OF THE INVENTION

Figure 1:
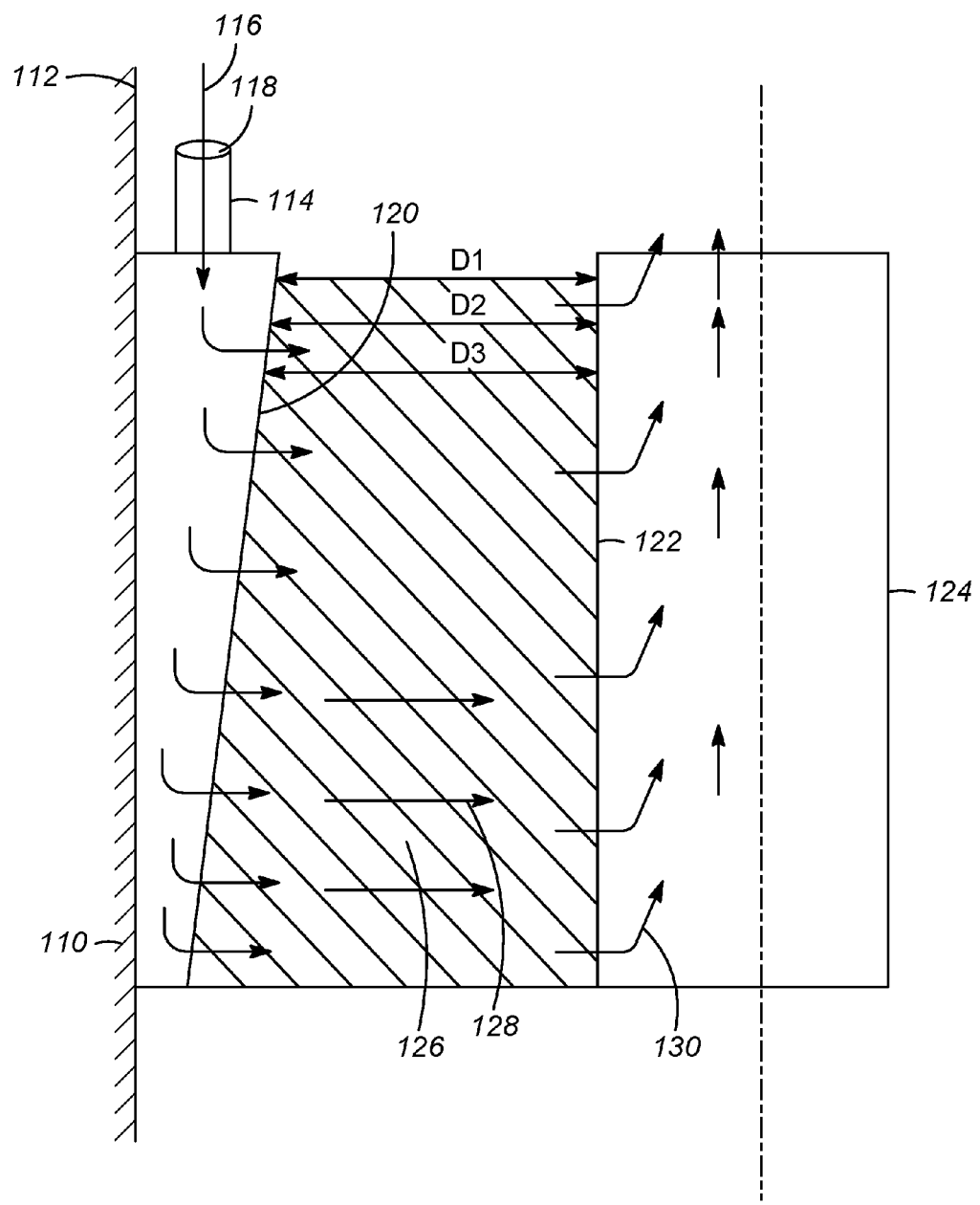
FIG. 1 shows an embodiment of the apparatus having a tapered front wall.

A problem exists with radial flow reactors where a catalyst flows down an annular region, and the annular region is defined by an inner screened partition and an outer screened partition, which defines the catalyst bed, or a particle retention volume for holding a granular solid. A fluid, usually a gas, flows across the partitions and catalyst bed, reacting with the catalyst to produce a product fluid, also usually a gas. The reactor holds the catalyst in with screens where the gas flows through. The dimension of these screens are typically established to minimize the pressure drop required to provide a uniform radial and axial gas distribution; however, this requires a significant volume within the reactor. In an embodiment, the apparatus of the present invention is oriented for the downward, or in the direction of gravity, flow of a solid through the apparatus with the cross flow of a gas, and accordingly, the use of the terms downward and upward are in reference to directions relative to the direction of gravity.

The existing prior art scallops and outer baskets for these processes all have a constant cross sectional area along the length of the scallops/baskets. Scallops and equivalent functioning reactor internal components have now been configured in the present invention to have a varying cross sectional area along the length of the scallops/baskets (have a larger cross sectional area near the inlet/outlet nozzle and a smaller cross sectional area at the opposite end). In some instances, this configuration may be reversed.

In a radial flow reactor, the reactor comprises an inner surface and an outer surface with the catalyst disposed between the inner and outer surface forming a cylindrical structure. Depending on desired flow characteristics, the inner surface can be the inlet partition, with the outer surface as the outlet partition. In an alternative, the outer surface can be the inlet partition and the inner surface can be the outlet partition. Characteristics that would dictate the choice include, but are not limited to, the flow rate of the fluid, including whether the fluid expands or contracts due to increasing or decreasing the number of moles of chemicals within the fluid, as well as temperature changes in the fluid.

Contouring/tapering the back enclosure portion from the top to bottom of the scallop accommodates the riser for pressure drop minimization and distribution at the top and the downstream portion of the scallop to have a progressively reducing cross section corresponding to a volume reduction approaching nominally 50% of the original design size. Contouring/tapering the back enclosure portion also enables retaining the flat profile wire front face establishing a uniform catalyst bed depth and would make the new interchangeable design feasible for revamp service. 95+% of the feed enters the risers in the scallops and is contained in the enclosed scallop so the pocket behind the countered/tapered scallop is not affected and the reactor can remain cylindrical with no modification or design modification. The progressively reducing cross section from top to bottom is also advantageous to reduce velocity head conversion (approaches constant velocity or reduced deceleration) and enable reasonable distribution with decreased pressure drop incorporated into the system.

Current scallops have a constant cross sectional area along the length of the scallops. Discrete scallops may have an advantage over a one-piece basket in that individual scallops can be installed in individual sections, individual sections can be repaired or replaced discretely (as opposed to replacing an entire basket), if one scallop loses catalyst containment due to damage the entire basket does not loose containment. A modular (discrete sections) basket can be formed using a tapered front face made of profile wire.

The end nearest the inlet nozzle would have the full cross sectional area required for hydraulics. The cross sectional area would be decreased along the length to a physical minimum at the other end. This decreases the volume in the scallops by a significant amount (30%-50%). The scallops/reactor overall length would also be slightly reduced because the average catalyst bed cross sectional area is increased. The weight of the scallops would be reduced making installation easier, and the cost may also be reduced.

The back enclosure plate may be contoured/tapered from the top to bottom of the scallop. The riser sizing for pressure drop minimization and distribution at the top of the scallop is decoupled form the downstream portion of the scallop. The downstream portion of the scallop can be optimized to have a progressively reducing cross section corresponding to a volume reduction approaching nominally 60% of the original design size. Contouring/tapering the back enclosure portion also enables retaining the flat profile wire front face establishing a uniform catalyst bed depth and would make the new interchangeable design feasible for revamp or retrofit service. 95+% of the feed enters the risers in the scallops and is contained in the enclosed scallop so the pocket behind the countered/tapered scallop is not affected and the reactor can remain cylindrical.

The tapered scallops would be installed in a reactor in a similar fashion to existing scallops. Once installed the new tapered scallops form an effective continuous outer basket which contains the catalyst bed and also provides the inlet distribution volume for the vapor upstream of the catalyst bed (for inlet radial flow, reversed for outward radial flow).

FIG. 1 indicates how the catalyst bed depth changes from the top to the bottom and provides for an increased catalyst volume within the reactor. In a reactor 110 is shown reactor shell 112. In an embodiment of the invention, vapor 116 is shown entering riser 114 through aperture 118. A catalyst bed 126 is shown between surfaces 120 and 122 which may be a screen material in some embodiments. Catalyst bed 126 has a varying sized diameter with D2 greater than or equal to D1 and D3 greater than or equal to D2 and D3 greater than or equal to a diameter taken at the top of catalyst bed 126. Also shown in FIG. 1 is radial flow vapor 128 shown circulating in an upward direction as vapor flow 130 into a centerpipe portion 124 of reactor 110.

Figure 2C:
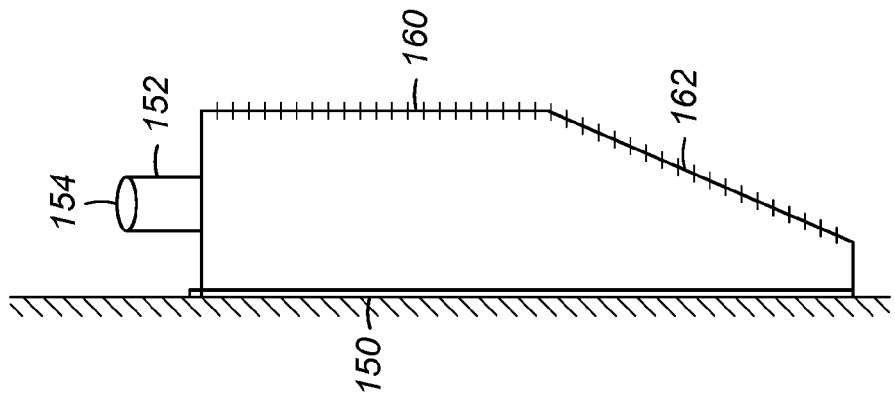
FIG. 2C shows a partially tapered face of the apparatus with the taper started a distance down the face with the taper.
Figure 2B:
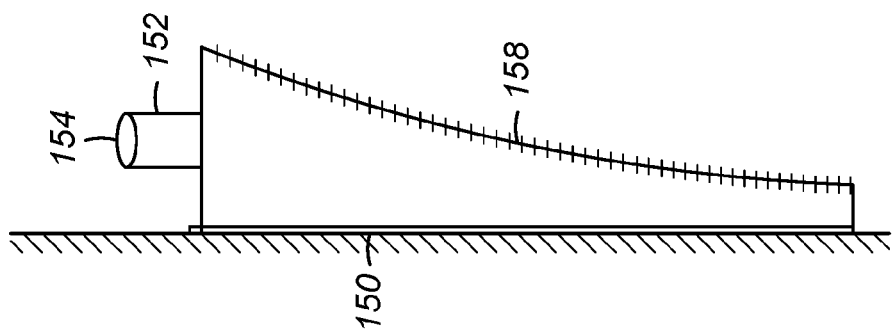
FIG. 2B shows a front tapered face of the apparatus with a curved or parabolic front face in the middle.
Figure 2A:
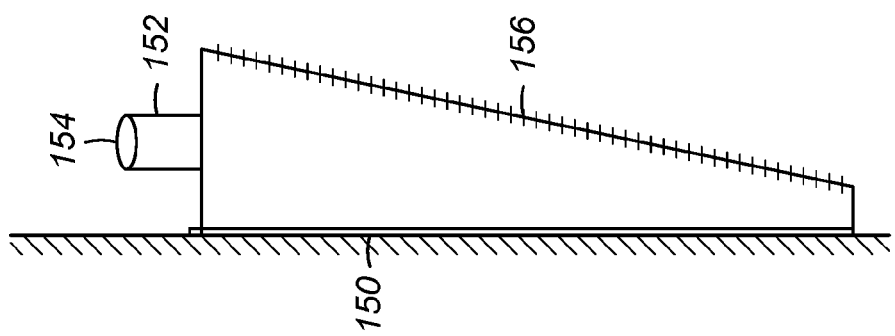
FIG. 2A shows a front tapered face of the apparatus with a straight (linear) taper on the left side.

FIG. 2A, FIG. 2B and FIG. 2C show different configurations of the tapered modular basket, what is described here as a "straight" (linear) taper on the left side, a curved or parabolic front face in the middle, and then a "partial" taper, where the taper does not start until a distance down. These configurations may apply to a tapered outer basket or a tapered scallop. More specifically, the straight taper configuration in FIG. 2A shows a reactor shell 150 on the left side, a riser 152 having an aperture 154 on the top and a tapered side 156 that comprises profile wire or a perforated material. In the middle curved front face configuration of FIG. 2B is seen the reactor shell 150 on the left side, the riser 152 having the aperture 154 on the top and a curved or parabolic front face 158 that also comprises profile wire or a perforated surface. On the right side in FIG. 2C is a partially tapered configuration with the reactor shell 150 on the left side, the riser 152 having the aperture 154 on the top and a front face having a vertical portion 160 and a tapered portion 162 that is shown as a straight taper but it may also may a curved taper similar to curved or parabolic front face 158.

Figure 3:
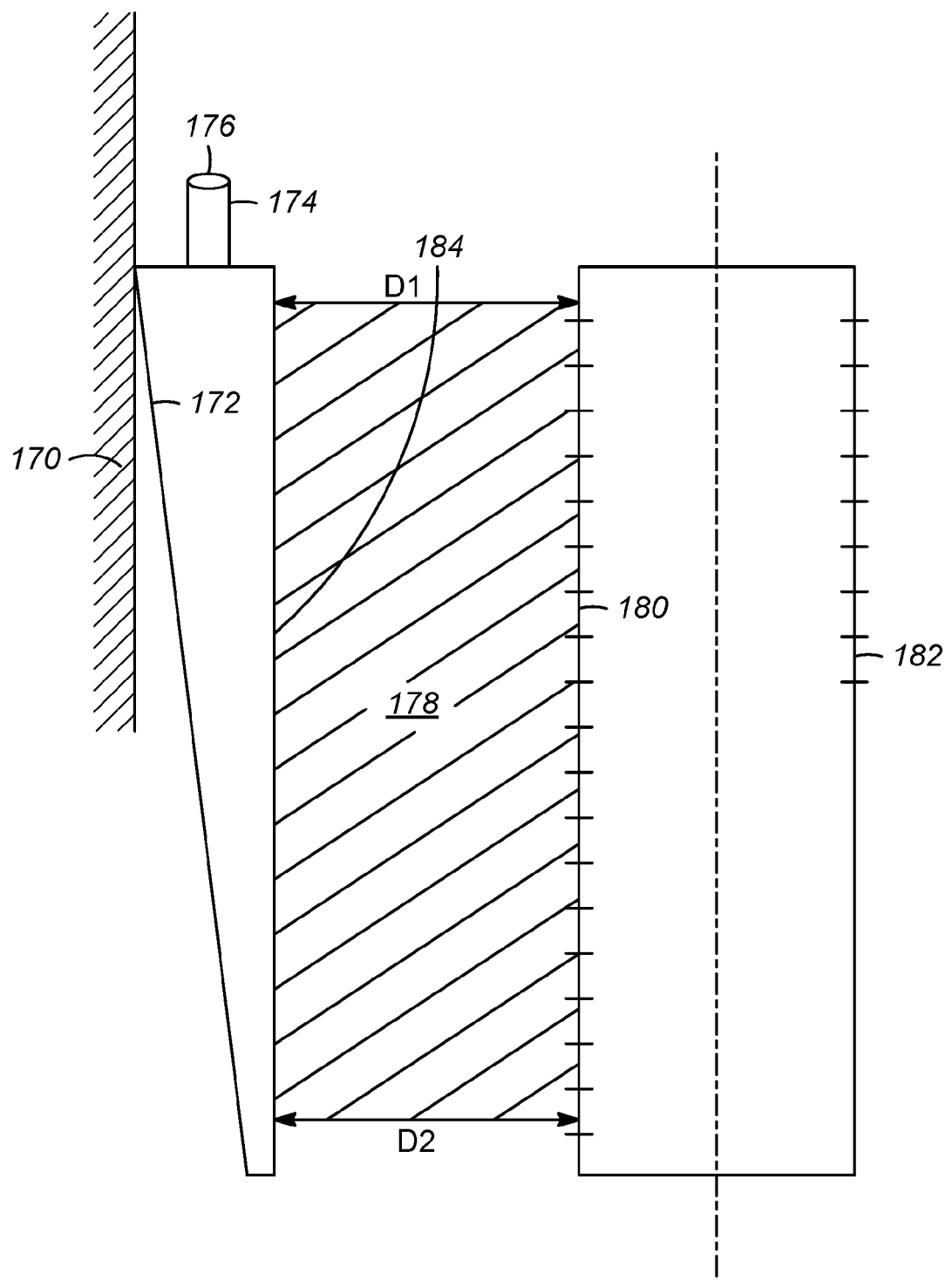
FIG. 3 shows an apparatus having a rear side tapered with a catalyst bed having a constant bed depth.

FIG. 3 shows the back side being tapered with a catalyst bed depth that remains constant. More specifically is shown a reactor shell wall 170 with a tapered rear side 172 of a basket or other catalyst retention structure. The tapered rear side 172 may be achieved with an existing or new structure by inserting a solid angled plate between reactor shell wall 170 and a rear side to result in tapered rear side 172. A riser 174 having an aperture 176 is shown and a straight front face 184. A center pipe is defined by surfaces 180 and 182. D1 and D2 are equal with catalyst bed 178 shown in between them having a constant catalyst depth especially compared to the tapered catalyst bed of FIG. 1.

Figure 4A:
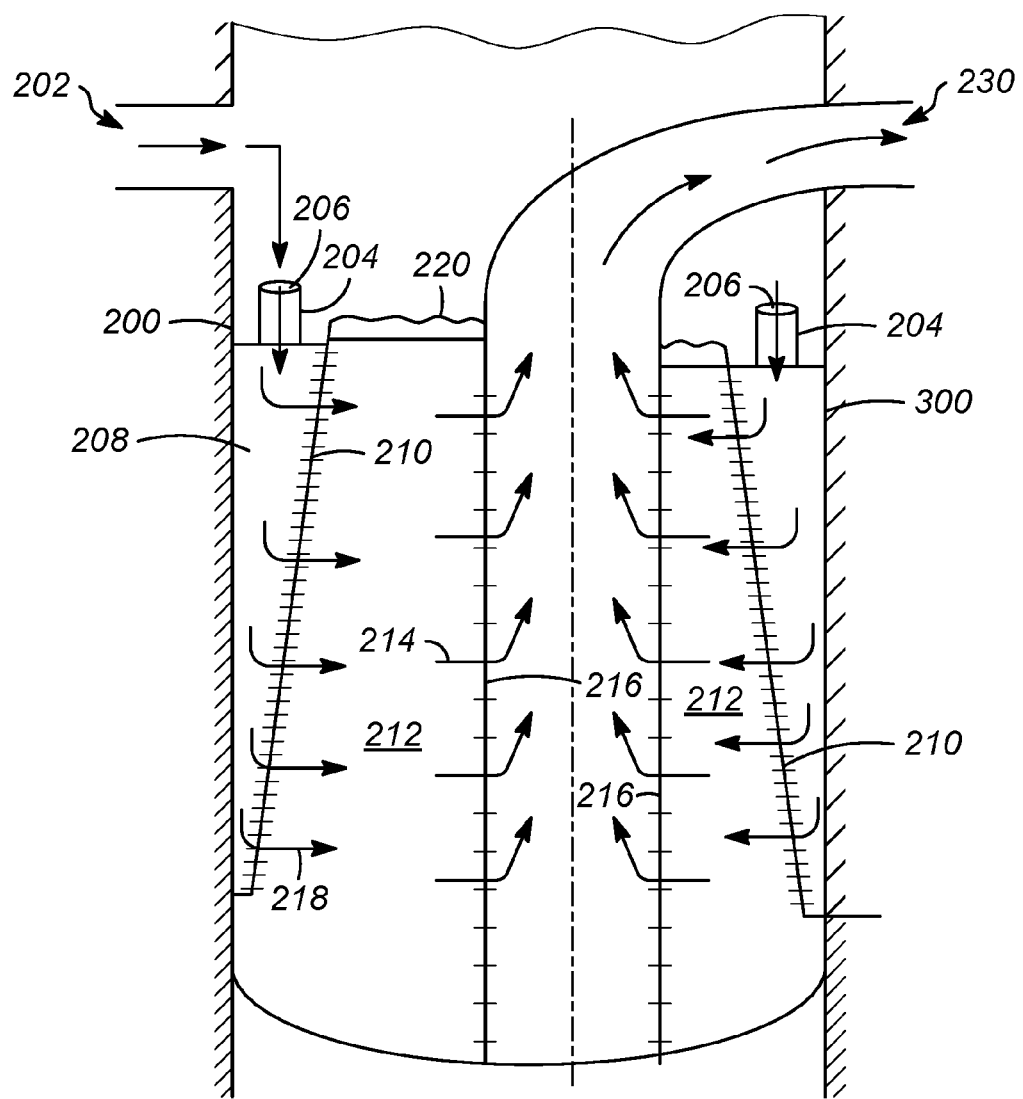
FIG. 4A shows an apparatus with a taper having a top fluid inlet and a top fluid outlet
Figure 4B:
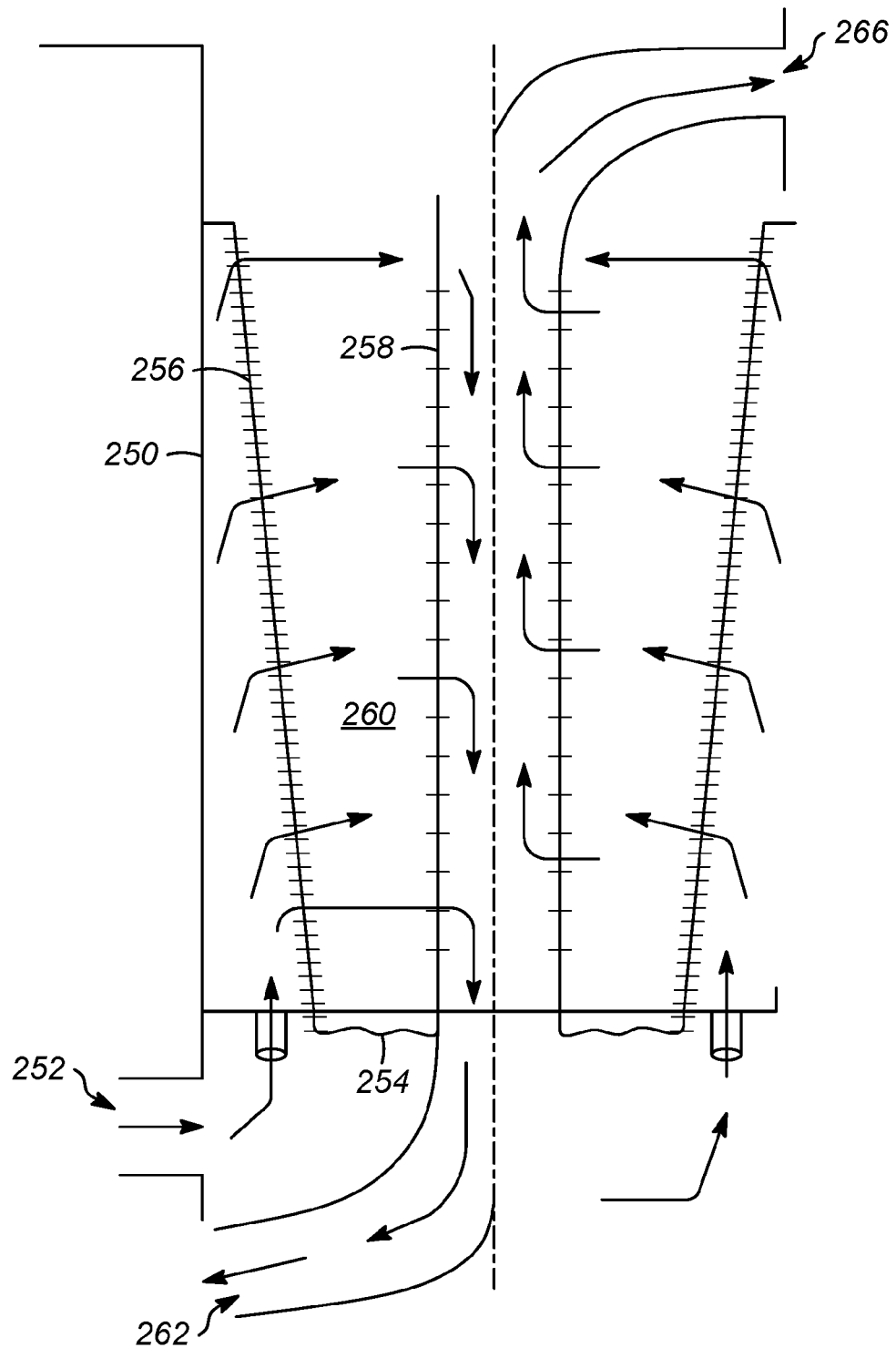
FIG. 4B shows an apparatus with a taper having a bottom fluid inlet and both top and bottom fluid outlets.

FIGS. 4A and 4B show two possible configurations for a tapered device. In FIG. 4A is shown a top vapor inlet, top vapor outlet configuration. A reactor having a reactor shell 200 is shown with inlet vapor entering inlet 202 at a top portion of the reactor and passing to riser 204 through aperture 206. Vapor 218 then passes into a catalyst bed 212 that is between surfaces 210 and 216 (center pipe through which vapor exits outlet 230 at a top of the reactor. In another configuration, the reactor may have a bottom vapor inlet and bottom vapor outlet. On the right side is shown a reactor having a reactor wall 250 with a tapered back face 256 with vapor entering bottom inlet 252 and passing through rear side 256 that is comprised of a screen or otherwise perforated material to allow vapor to flow through to catalyst bed 260 and out bottom outlet 262. Rear side 256 is shown as tapered relative to reactor wall 250 which in this configuration leaves a passageway for vapor to circulate in an upward direction as it passes to catalyst bed 260 and either pass to a centerpipe and go to a bottom vapor outlet 262 or to a top vapor outlet 266. It is contemplated that the tapered device could be used for a top-inlet, top-outlet configuration, a bottom-inlet, bottom-outlet configuration, as well as a bottom-inlet, top-outlet configuration as shown in the two parts of this Figure.

Figure 5A:
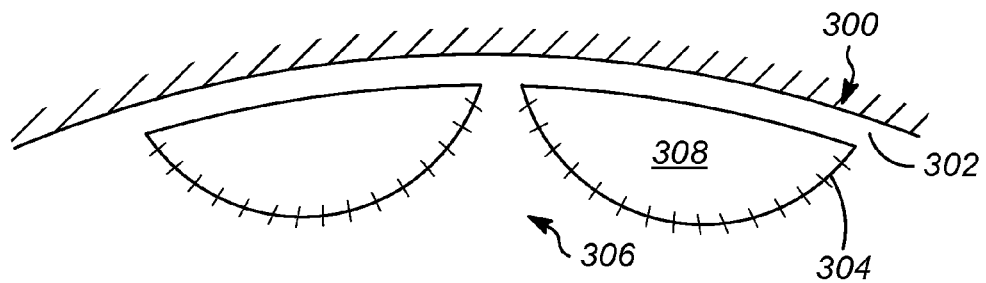
FIG. 5A and FIG. 5B show an apparatus in which the scallops are D-shaped in configuration.
Figure 5B:
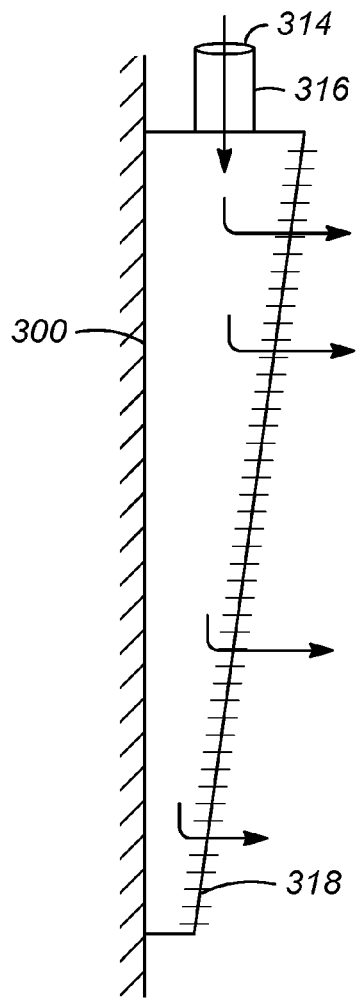

FIGS. 5A and 5B show a tapered D Shaped scallop from a plan view and an elevation view. In the top view of FIG. 5A, a reactor shell 300 is shown with a solid back face 302 of scallop 308 and a front face 304 that is perforated. An elevation view in FIG. 5B shows reactor shell 300 with a vapor flow passing into riser 316 through aperture 314.

Figure 6B:
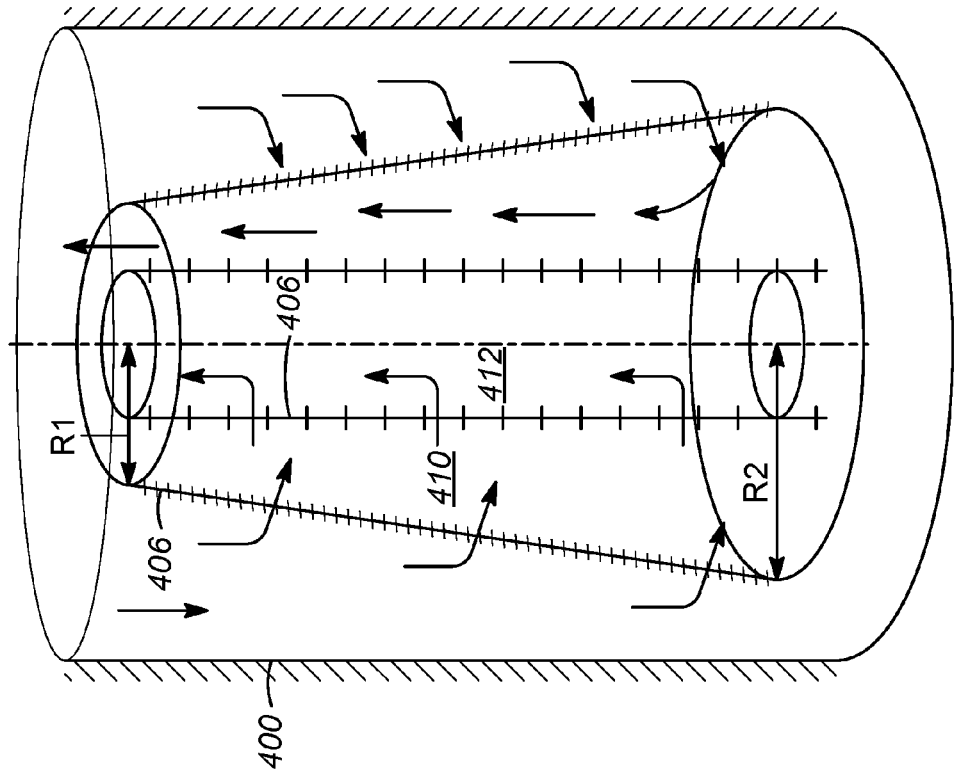
FIG. 6A and FIG. 6B show an apparatus having a tapered continuous basket that defines the catalyst bed.
Figure 6A:
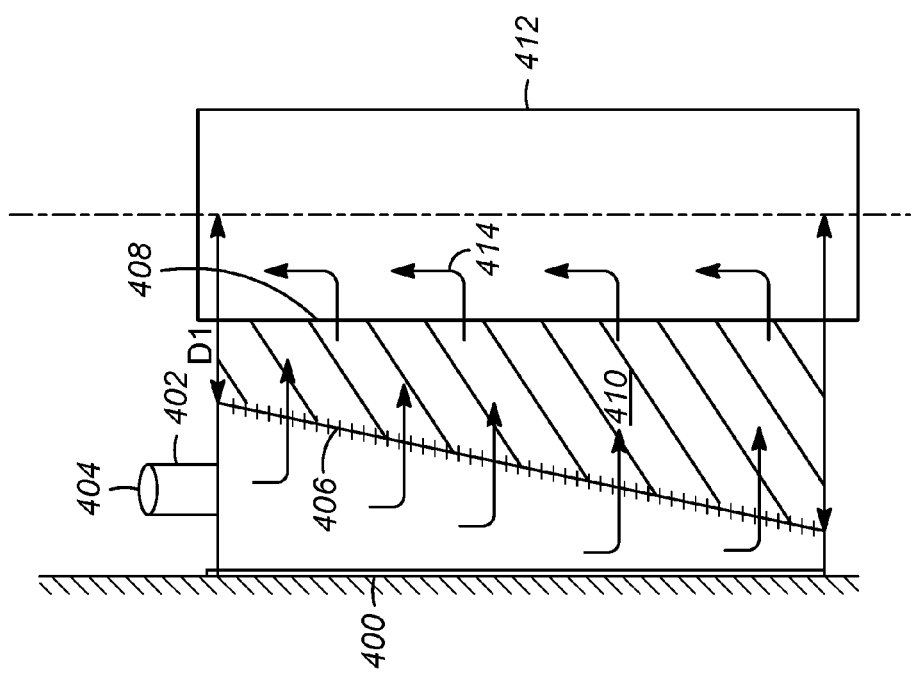

FIGS. 6A and 6B show a configuration where the radius of the catalyst bed is less at the top as compared to the bottom of the catalyst bed. A reactor shell 420 is shown with vapor entering a top inlet (not shown) and passing through a screen or perforated surface 400 that is tapered. Vapor flows into catalyst bed 410 to centerpipe 412 and flows out a top portion. R1 is less than R2 in this configuration.

Figure 7A:
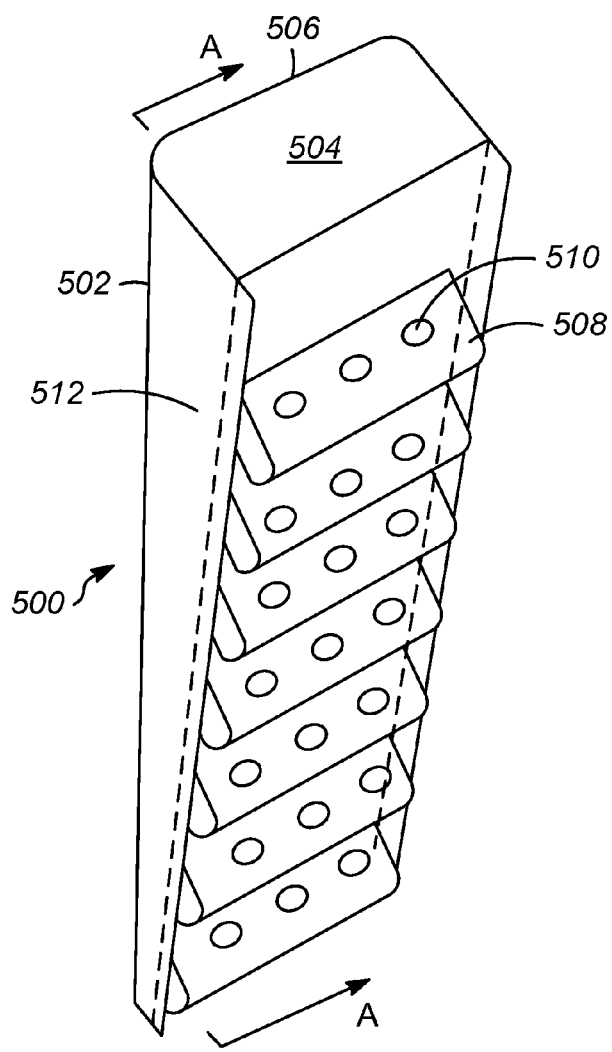
FIG. 7A shows a tapered apparatus having a louvered front face.
Figure 7B:
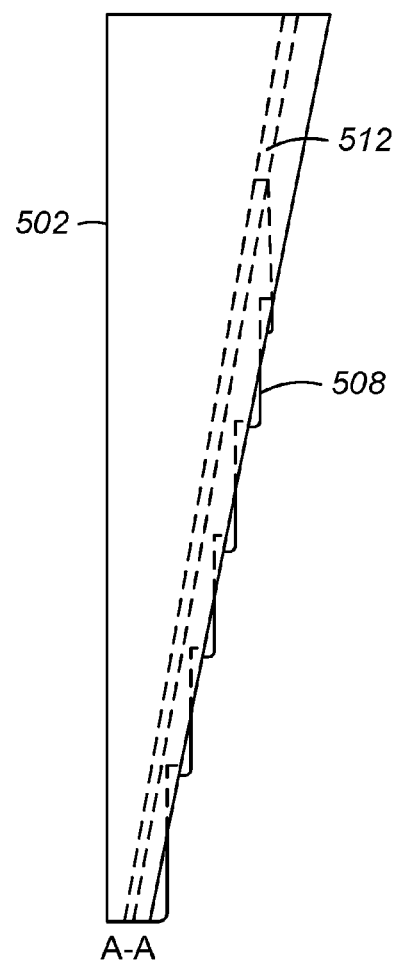
FIG. 7B shows a side view of a tapered apparatus having a louvered front face.

FIGS. 7A and 7B, respectfully, show a front view and a side view of an embodiment of the invention having a louvered front face to reduce catalyst bed pressure build up in the reactor on the centerpipe, scallop and in the catalyst bed itself. A tapered louvered front face 500 is shown with a side wall 512, a back surface 502 and a back of a top surface 506. Louver 508 have openings 510.

In some embodiments, the inlet screen may be a uniform basket as opposed to other embodiments where there is a conduit against the vessel wall.

There may be apertures within the outlet screen for aiding axial flow distribution in which inlet basket tapering affects the overall pressure drop requirement to obtain axial flow distribution.

SPECIFIC EMBODIMENTS

While the following is described in conjunction with specific embodiments, it will be understood that this description is intended to illustrate and not limit the scope of the preceding description and the appended claims.

A first embodiment of the invention is an apparatus directing a fluid in a radial reactor comprising a vertically elongated conduit comprising a front face comprising a surface comprising apertures, two side faces, and a rear face and two ends, wherein a first end of the front face closest to a vapor inlet and a first end of the rear face closest to the vapor inlet are a distance D1 apart and wherein a second end of the front face and a second end of the rear face are a distance D2 apart wherein D1 is greater than D2 and wherein a riser is connected to a top surface of the vertically elongated conduit to allow a gas stream to flow through the riser to the vertically elongated conduit. An embodiment of the invention is one, any or all of prior embodiments in this paragraph up through the first embodiment in this paragraph wherein a ratio of D1 to D2 is between about 1.1 to 10. An embodiment of the invention is one, any or all of prior embodiments in this paragraph up through the first embodiment in this paragraph wherein the surface comprising apertures comprises a screen. An embodiment of the invention is one, any or all of prior embodiments in this paragraph up through the first embodiment in this paragraph wherein the vapor inlet is at a bottom of the apparatus or at a top of the apparatus. An embodiment of the invention is one, any or all of prior embodiments in this paragraph up through the first embodiment in this paragraph wherein the vertically elongated inlet conduit further comprises a top portion having a wider cross section that is at least as wide as an opening of the riser. An embodiment of the invention is one, any or all of prior embodiments in this paragraph up through the first embodiment in this paragraph wherein the vertically elongated inlet conduit is within a radial reactor, wherein the radial reactor has an inner reaction zone disposed within a reactor vessel, and where the front face has a flat structure and the rear face has a curved structure or a flat structure. An embodiment of the invention is one, any or all of prior embodiments in this paragraph up through the first embodiment in this paragraph wherein the vertically elongated inlet conduit is within a radial reactor, wherein the radial reactor has an inner reaction zone disposed within a reactor vessel, and where the front face has a curved structure and the rear face has a curved structure or a flat structure. An embodiment of the invention is one, any or all of prior embodiments in this paragraph up through the first embodiment in this paragraph further comprising support bars disposed within the duct to provide rigidity.

A second embodiment of the invention is an apparatus comprising a vertically oriented, substantially cylindrical vessel having a fluid inlet and a fluid outlet; a vertically oriented center pipe disposed within the vessel and having a fluid inlet and a fluid outlet, where either the fluid inlet or fluid outlet comprises apertures in the center pipe wall; and a plurality of vertical outer ducts arranged circumferentially around the interior of the vessel wall, each outer duct comprising a front face, two side faces, and a rear face, where the rear face is proximate to the vessel wall, and the front face comprises a plate having apertures defined therein; a vertically elongated inlet conduit comprising a front face, two side faces, and a rear face, wherein a first end of the front face and a corresponding first end of the rear face are a distance D1 apart and wherein a second end of the front face and a corresponding second end of the rear face are a distance D2 apart wherein D1 is greater than D2; and wherein a particle retention volume is defined by the space between the front faces of the vertical outer ducts and the wall of the center pipe. An embodiment of the invention is one, any or all of prior embodiments in this paragraph up through the second embodiment in this paragraph wherein the vessel wall is cylindrical. An embodiment of the invention is one, any or all of prior embodiments in this paragraph up through the second embodiment in this paragraph wherein the vessel wall has a circular cross section, wherein the circular cross section has a smaller diameter at a bottom of the vessel than at a top of the vessel. An embodiment of the invention is one, any or all of prior embodiments in this paragraph up through the second embodiment in this paragraph wherein the wall of the center pipe is tapered to be parallel to the front faces of the vertically elongated conduits. An embodiment of the invention is one, any or all of prior embodiments in this paragraph up through the second embodiment in this paragraph wherein the rear face and side faces of the vertically elongated conduits are non-perforated surfaces. An embodiment of the invention is one, any or all of prior embodiments in this paragraph up through the second embodiment in this paragraph where the fluid inlet communicates with the interior of the vertically elongated conduits and the center pipe communicates with the fluid outlet to create a radially inward fluid flow path through the particle retention volume. An embodiment of the invention is one, any or all of prior embodiments in this paragraph up through the second embodiment in this paragraph further comprising an inlet for solid particles and an outlet for solid particles, wherein the inlet and outlet are in fluid communication with the particle retention volume.

A third embodiment of the invention is an apparatus directing a fluid in a radial reactor comprising a vertically elongated conduit comprising a front face comprising a surface comprising apertures, two side faces, and a rear face, wherein a bottom of the front face and a bottom of the rear face are a distance D1 apart and wherein a top of the front face and a top of the rear face are a distance D2 apart wherein D1 is greater than D2 and wherein a riser is connected to a top surface of the vertically elongated conduit to allow a gas stream to flow through the riser to the vertically elongated conduit. An embodiment of the invention is one, any or all of prior embodiments in this paragraph up through the third embodiment in this paragraph wherein the apparatus has a vapor inlet on a bottom of the apparatus.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. An apparatus in a radial reactor comprising:
a vertically elongated conduit extending around a circumference of an outer wall of said radial reactor wherein a distance measured from one side of said vertically elongated conduit to an opposite side of said vertically elongated conduit at a top of said vertically elongated conduit is different than a distance measured at a lower location on said vertically elongated conduit, and wherein said vertically elongated conduit has a riser at a top; and
a vertically oriented center pipe in said radial reactor; and
a catalyst bed defined by the cylindrical center pipe and an inner side of said vertically elongated conduit, wherein a distance from the cylindrical center pipe to the inner side of the vertically elongated conduit at a top of the catalyst bed is different from a distance measured at a lower location of the catalyst bed;

wherein when the distance at the top of said vertically elongated conduit is greater than the distance at the lower location, the distance at the top of the catalyst bed is less than the distance at the lower location; and wherein when the distance at the top of said vertically elongated conduit is less than the distance at the lower location, the distance at the top of the catalyst bed is greater than the distance at the lower location.

2. The apparatus of claim 1 wherein a vapor inlet is at a bottom of said apparatus or at a top of said apparatus.

3. The apparatus of claim 1 wherein said radial reactor has an inner reaction zone disposed within a reactor vessel, and where a front face of said vertically elongated conduit has a flat structure and a rear face has a curved structure or a flat structure.

4. The apparatus of claim 1 wherein said radial reactor has an inner reaction zone disposed within a reactor vessel, and where said vertically elongated conduit has a front face that has a curved structure and said vertically elongated conduit has a rear face that has a curved structure or a flat structure.

5. The apparatus of claim 1 wherein said vertically elongated conduit comprises a front face comprising a surface comprising apertures, two side faces, and a rear face and two ends, wherein a first end of said front face closest to a vapor inlet and a first end of said rear face closest to said vapor inlet are a distance D1 apart and wherein a second end of said front face and a second end of said rear face are a distance D2 apart wherein D1 is greater than D2 and wherein a riser is connected to a top surface of said vertically elongated conduit to allow a gas stream to flow through said riser to said vertically elongated conduit.

6. The apparatus of claim 5 wherein a ratio of D1 to D2 is between about 1.1 to 10.

7. The apparatus of claim 5 wherein said surface comprising apertures comprises a screen.

8. The apparatus of claim 2 further comprising support bars disposed within the vertically elongated conduit to provide rigidity.

9. A radial flow apparatus comprising:
a vertically oriented, substantially cylindrical vessel having a fluid inlet and a fluid outlet;
a vertically oriented center pipe disposed within the vessel and having a fluid inlet and a fluid outlet, where either the fluid inlet or fluid outlet comprises apertures in the center pipe wall; and
at least one vertical outer duct arranged circumferentially around the interior of the vessel wall;
wherein said at least one vertical outer duct comprises a front face, two side faces, and a rear face, where the rear face is proximate to the vessel wall, and the front face comprises a plate having apertures defined therein;
wherein a first end of said front face and a corresponding first end of said rear face are a distance D1 apart and wherein a second end of said front face and a corresponding second end of said rear face are a distance D2 apart wherein D1 is greater than D2, and wherein said vertically elongated inlet conduit has a riser from a top;
a catalyst bed defined by the space between said front face of said vertical outer duct and a wall of the center pipe; and
wherein the distance at the top of the catalyst bed is less than the distance at the lower location.

10. The apparatus of claim 9 wherein the rear face and side faces of the vertically elongated inlet conduits are non-perforated surfaces.

11. The apparatus of claim 9 where the fluid inlet communicates with the interior of the at least on vertical duct and the center pipe communicates with the fluid outlet to create a radially inward fluid flow path through the catalyst bed.

12. The apparatus of claim 9 further comprising an inlet for solid particles and an outlet for solid particles, wherein the inlet and outlet are in fluid communication with the catalyst bed.

13. An apparatus in a radial reactor comprising:
a vertically elongated conduit comprising a front face comprising a surface comprising apertures, two side faces, and a rear face, wherein a bottom of said front face and a bottom of said rear face are a distance D1 apart and wherein a top of said front face and a top of said rear face are a distance D2 apart wherein D1 is greater than D2 and wherein a riser is connected to a top surface of said vertically elongated conduit to allow a gas stream to flow through said riser to said vertically elongated conduit;
a vertically oriented center pipe in said radial reactor; and
a catalyst bed defined by the cylindrical center pipe and an inner side of said vertically elongated conduit, wherein a distance from the cylindrical center pipe to the inner side of the vertically elongated conduit at a top of the catalyst bed is different from a distance measured at a lower location of the catalyst bed;
wherein the distance at the top of the catalyst bed is greater than the distance at the lower location.

14. The apparatus of claim 13 wherein said apparatus has a vapor inlet on a bottom of said apparatus.

* * * * *